United States Patent [19]
Utsumi

[11] Patent Number: 6,088,312
[45] Date of Patent: Jul. 11, 2000

[54] RECORDING APPARATUS, RECORDING SYSTEM AND DUBBING METHOD

[75] Inventor: Yoshimasa Utsumi, Tokyo, Japan

[73] Assignee: Sony Corporation, Tokyo, Japan

[21] Appl. No.: 09/076,966

[22] Filed: May 13, 1998

[30] Foreign Application Priority Data

May 23, 1997 [JP] Japan ................................ P09-134043

[51] Int. Cl.⁷ .................................................. G11B 7/00
[52] U.S. Cl. ................................ 369/47; 369/54; 369/83
[58] Field of Search .............................. 369/83–85, 47, 369/54; 36/13; 386/4

[56] References Cited

U.S. PATENT DOCUMENTS

| | | | |
|---|---|---|---|
| 5,325,352 | 6/1994 | Matsumo ................................ | 369/84 X |
| 5,521,894 | 5/1996 | Hiranuma .............................. | 369/84 X |
| 5,625,610 | 4/1997 | Hiranuma .............................. | 369/84 X |
| 5,625,611 | 4/1997 | Yokota et al. ...................... | 369/47 OR |
| 5,862,104 | 1/1999 | Matsumoto .......................... | 369/84 X |
| 5,881,041 | 3/1999 | Takenaka .............................. | 369/85 X |

*Primary Examiner*—Aristotelis M. Psitos
*Attorney, Agent, or Firm*—Limbach & Limbach L.L.P.

[57] ABSTRACT

A recording apparatus for use when programs are dubbed one after another accompanied by character input. If a user has not finished inputting characters such as a title about the currently dubbed program, the apparatus places the dubbing of the next program into a standby state so that the user may take his time entering the necessary characters regarding the current program.

4 Claims, 7 Drawing Sheets

FIG. 3

| | 16BITS | | 16BITS | | |
|---|---|---|---|---|---|
| | MSB      LSB | MSB       LSB | MSB       LSB | MSB       LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER H | CLUSTER L | SECTOR | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | MAKER CODE | MODEL CODE | FIRST TNO | LAST TNO | 7 |
| | 00000000 | 00000000 | 00000000 | USED SECTORS | 8 |
| | 00000000 | 00000000 | 00000000 | 00000000 | 9 |
| | 00000000 | 00000000 | 00000000 | DISC SERIAL NO. | 10 |
| CORRESPONDING TABLE DESIGNATING DATA | DISK | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGEMENT TABLE (255 SLOTS) | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

U-TOC SECTOR 0

FIG. 5

| | 16BITS | | 16BITS | | |
|---|---|---|---|---|---|
| | MSB LSB | MSB LSB | MSB LSB | MSB LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER H | CLUSTER L | SECTOR | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| CORRESPONDING TABLE DESIGNATING DATA { | 00000000 | 00000000 | 00000000 | P-EMPTY | 11 |
| | 00000000 | P-TNA1 | P-TNA2 | P-TNA3 | 12 |
| | P-TNA4 | P-TNA5 | P-TNA6 | P-TNA7 | 13 |
| | P-TNA248 | P-TNA249 | P-TNA250 | P-TNA251 | 74 |
| | P-TNA252 | P-TNA253 | P-TNA254 | P-TNA255 | 75 |
| | DISK NAME | | | | 76 |
| | DISK NAME | | | LINK INFORMATION | 77 |
| CHARACTER TABLE { (01h) | DISK NAME/TRACK NAME | | | | 78 |
| | DISK NAME/TRACK NAME | | | LINK INFORMATION | 79 |
| (02h) | DISK NAME/TRACK NAME | | | | 80 |
| | DISK NAME/TRACK NAME | | | LINK INFORMATION | 81 |
| (03h) | DISK NAME/TRACK NAME | | | | 82 |
| | DISK NAME/TRACK NAME | | | LINK INFORMATION | 83 |
| (FEh) | DISK NAME/TRACK NAME | | | | 584 |
| | DISK NAME/TRACK NAME | | | LINK INFORMATION | 585 |
| (FFh) | DISK NAME/TRACK NAME | | | | 586 |
| | DISK NAME/TRACK NAME | | | LINK INFORMATION | 587 |

U-TOC SECTOR 1

RECORDING APPARATUS, RECORDING SYSTEM AND DUBBING METHOD

BACKGROUND OF THE INVENTION

1. Field of the Invention

The present invention relates to a recording apparatus, a recording system and a dubbing method whereby character information is recorded as auxiliary information to a recording medium such as a magneto-optical disk when main information such as audio data is recorded concurrently to that medium.

2. Description of the Related Art

There exist recording and reproducing apparatuses for recording and reproducing audio data to and from magneto-optical disks exemplified by so-called mini-disks. The magneto-optical disk has a program area that records audio data and a management area that stores table of contents information (U-TOC or user table of contents) for managing the programs recorded in the program area.

The management area containing the table-of-contents information (U-TOC) has a plurality of sectors. A U-TOC sector 0, one of the sectors, retains a start address, an end address, copy protect information and emphasis information about each of the programs recorded in the program area. In the description that follows, the wording "program" will refer to a group of data recorded as a data unit on the disk. For example, a program may be a piece of music (commonly called a track). In such a case, the start address and the end address of a program correspond respectively to the starting and ending positions of a piece of music.

A U-TOC sector 1 holds a title of each of the programs stored in the program area, as well as a title representing the entire magneto-optical disk in question. The title of the entire disk corresponds to information about an album title and names of players or performers if the recorded programs constitute audio data. The title of each program denotes that of a music piece.

A U-TOC sector 2 retains the dates and the times of day at which the programs were recorded in the program area.

A U-TOC sector 4 is arranged to accommodate katakana and kanji characters used as fonts to express the titles of the programs recorded in the program area as well as the title of the entire magneto-optical disk.

The above type of recording apparatus permits inputting character information such as titles representing the programs recorded on the disk. Such character input is accomplished by use of alphabetic keys on a remote controller of the recording apparatus, and/or operation keys, a jog dial or other controls attached to the body of the apparatus.

While audio information constituting a program is being dubbed for recording, a user may input characters denoting the program by operating alphabetic keys or other controls on the remote controller. It may then happen that there are too many characters expressing a program title or the user has taken too much time entering the title, for the character input to be completed before the currently dubbed program is terminated and replaced by the next program.

The input character information is saved as U-TOC data corresponding to the program currently designated by the user for recording, reproduction or temporary halt. Inputting characters during program recording causes the entered characters to be saved as data about the program being recorded. If the current program has ended and is replaced by the next program while the corresponding character input by the user is still in progress, the character input status only halfway complete is set to a U-TOC update memory then and there.

Conventionally, to stop halfway the recording process (typically dubbing) requires performing various control manipulations again. Such manipulations include selection and setting of the current program to be reproduced, execution of a reproduction start operation, setting of an appropriate recording position, and execution of a recording start operation. If it is not clear where the current program has ended and is taken over by the next program, the dubbing process may have to be repeated all over again.

It is thus not desirable for the user to interrupt dubbing halfway and modify the input characters. Where the title name or the like is truncated during its input and saved as such into the memory, it is only after all programs have been dubbed that the user can start correcting the defective entries. This can be a considerable impediment to carrying out dubbing and like recording processes efficiently.

SUMMARY OF THE INVENTION

It is therefore an object of the present invention to provide a recording apparatus, a recording system and a dubbing method whereby the dubbing of a given program is placed in a standby state if the input of character information such as a title of the program in question is not finished by the end of the dubbing process of the current program.

In carrying out the invention and according to one aspect thereof, there is provided a recording apparatus for recording supplied data as programs to a recording medium having a program area for recording programs and a management area for recording management information about the programs recorded in the program area. The recording apparatus comprises: a character inputting means for inputting character information about programs to be recorded; a detecting means for detecting a change from one supplied program to another to be recorded; a judging means for judging whether the input of character information by the character inputting means has ended upon detection of a change to the next program by the detecting means; and a controlling means used when the judging means does not judge the character information input to have ended, the controlling means thereupon placing the recording operation into a standby state and issuing an instruction to put the supply of the next program into a standby state.

According to another aspect of the invention, there is provided a recording system made of a reproducing part and a recording part, the recording part recording programs supplied from the reproducing part to a recording medium having a program area for recording programs and a management area for recording management information about the programs recorded in the program area. The recording system comprises: a character inputting means for inputting character information about programs to be recorded; a detecting means for detecting a change of a program supplied from the reproducing part; a judging means for judging whether the input of character information by the character inputting means has ended upon detection of the program change by the detecting means; and a controlling means used when the judging means does not judge the character information input to have ended, the controlling means thereupon placing the recording operation into a standby state and issuing an instruction to put the supply of the next program from the reproducing part into a standby state.

According to a further aspect of the invention, there is provided a dubbing method comprising the steps of: detecting a change of a program transmitted from a reproducing device; when the detecting step detects a change of the programs transmitted from the reproducing device, judging, as a first judging step, whether a character input corresponding to the program has ended; when the first judging step does not judge the character input corresponding to the program to have ended, providing controls to place into a standby state the transmission of the next program from the reproducing device and to put the recording operation into a standby state; judging, as a second judging step, whether the character input has ended when both the transmission of the next program from the reproducing device and the recording operation are placed into the standby state; and when the second judging step judges the character input to have ended, canceling the standby state of both the transmission of the next program from the reproducing device and the recording operation.

The embodiment when embodied as outlined above halts temporarily the progress of the program being currently dubbed until the user's manipulations for inputting characters are completed. At this point, the dubbing process as part of the system function is obviously put on hold. When the character input has ended, the dubbing process is resumed automatically from the data position where the process was interrupted. With the whole process automated, there is no operational chores to be done additionally by the user.

Other objects, features and advantages of the invention will become more apparent upon a reading of the following description and appended drawings.

BRIEF DESCRIPTION OF THE DRAWINGS

FIG. 3 is a schematic view of a management data structure for recording on a magneto-optical disk applicable to this invention;

FIG. 5 is a schematic view showing how discrete areas are linked on a magneto-optical disk applicable to this invention;

DESCRIPTION OF THE PREFERRED EMBODIMENTS

Preferred embodiments of this invention will now be described with reference to the accompanying drawings. In the description that follows, an MD (mini-disk) recorder will be cited as a typical recording apparatus, and a CD (compact disk) player as a typical reproducing apparatus that supplies program data to the MD recorder for dubbing purposes. The MD recorder and the CD player may be either formed integrally, or furnished separately and connected at the time of the dubbing process.

Figure 1:
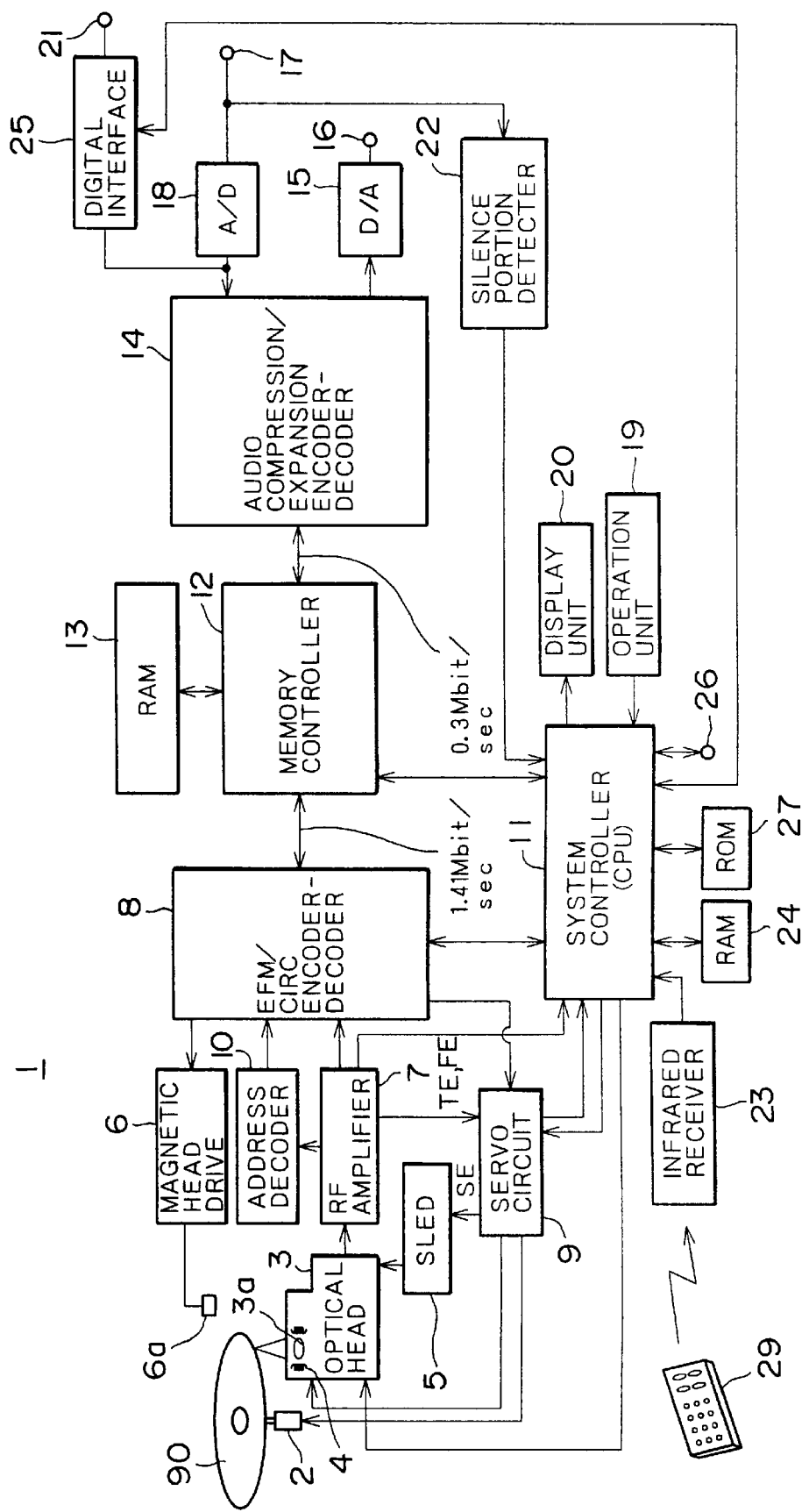
FIG. 1 is a block diagram of a magneto-optical disk recording apparatus applicable to this invention.

The headings involved are as follows:
1. MD Recorder
2. MD Track Format
3. U-TOC
4. Constitution of CD-MD Dubbing System
5. Control on CD-MD Dubbing Session 1. MD Recorder FIG. 1 is a block diagram of an MD recorder 1 embodying the invention. The MD recorder 1 enables audio data to be recorded and reproduced to and from a magneto-optical disk (MD) 90.

The magneto-optical disk 90 is housed in a cartridge, not shown. A shutter mechanism mounted on the cartridge opens and closes during recording or reproduction, allowing light from an optical head 3 and a magnetic field from a magnetic head to be applied to the disk surface. The magneto-optical disk 90 is rotated by a spindle motor 2 and is controlled at a constant linear velocity (CLV) thereby.

The optical head 3 is positioned opposite to the magnetic head 6a across the loaded magneto-optical disk 90. The optical head 3 comprises an objective lens 3a, a biaxial mechanism 4, a semiconductor laser device (not shown), and a light receiver that receives reflected light from the surface of the magneto-optical disk getting outgoing light from the semiconductor laser device.

The biaxial mechanism 4 has a focusing coil and a tracking coil. The focusing coil drives the objective lens 3a toward or away from the magneto-optical disk 90. The tracking coil drives the objective lens 3a in the radial direction of the magneto-optical disk 90. A sled mechanism 5 is also provided to drive the entire optical head 3 in large radial movements across the magneto-optical disk 90.

Reflected-light information detected by the light receiver in the optical head 3 is sent to an RF amplifier 7 for current-to-voltage conversion followed by matrix computations. In performing matrix computations, the RF amplifier 7 generates a focus error signal FE, a tracking error signal TE and an RF signal.

The RF signal is a reproduced signal generated on the basis of a magnetic field vector. The magnetic field vector is detected by use of the magnetic Kerr effect of reflected light brought about when light is applied to the magneto-optical disk 90 at a laser power level lower than that for recording.

The focus error signal FE and tracking error signal TE generated by the RF amplifier 7 are subject to phase compensation and gain control by a servo circuit 9. Past the servo circuit 9, the two signals are supplied to the focusing coil and tracking coil of the biaxial mechanism 4 via a drive amplifier, not shown.

A low-pass filter (LPF) in the servo circuit 9 generates a sled error signal on the basis of the tracking error signal TE. The sled error signal is sent to the sled mechanism 5 via a sled drive amplifier, not shown.

The RF signal generated by the RF amplifier 7 reaches an EFM/CIRC encoder-decoder 8 where the signal is converted to binary format, and subjected to EPM (eight-to-fourteen modulation) demodulation and CIRC (cross interleave read Solomon coding) error correction. After the processing by the EFM/CIRC encoder-decoder 8, the signal is supplied to a memory controller 12.

The magneto-optical disk 90 has tortuous grooves engraved thereon at a predetermined frequency (22.05 kHz with this embodiment). The grooves retain address data that were recorded through frequency modulation. The address data are extracted through FM demodulation by a band-pass filter (BPF) in an address decoder 10. The band-pass filter allows only a predetermined frequency to pass through.

The EFM/CIRC encoder-decoder 8 generates a spindle error signal that is fed to the spindle motor 2 through the servo circuit 9. The spindle error signal is used to control the disk in rotation based on either the binary EFM signal or the address data extracted by the address decoder 10.

In addition, the EFM/CIRC encoder-decoder 8 controls coarse positioning of PLL (phase locked loop) operations on the basis of the binary EFM signal. The EFM/CIRC encoder-decoder 8 also generates a reproduced clock signal for decoding.

The memory controller 12 writes the error-corrected binary data to a buffer memory 13 at a transfer rate of 1.4 megabits per second. When at least a predetermined amount of data is accumulated in the buffer memory 13, the memory controller 12 reads the data from the buffer memory 13 at a transfer rate of 0.3 megabits/sec., a rate sufficiently lower than that for writing data to the buffer memory 13. The data retrieved from the buffer memory 13 are output as audio data.

The fact that data have been accumulated in the buffer memory 13 before being output as audio data allows for disturbances disrupting the supply of audio data. If disturbances such as vibrations triggering a track jump interrupt the continuous supply of read data from the optical head 3, the buffer memory 13 still offers a sufficient amount of data to cover the time required to reposition the optical head 3 to the address where the track jump took place. The arrangement ensures uninterrupted audio output.

This embodiment illustratively utilizes a four-megabyte RAM as the buffer memory 13. In that setup, a buffer memory 13 full of data provides audio data lasting about 10 seconds in reproduction. The memory controller 12 is controlled by a system controller 11.

Data were recorded in compressed form to the magneto-optical disk 90 by a suitable compression method (e.g., acoustic transferred adapted coding or ATRAC for this embodiment). Under the memory controller 12, the data read from the magneto-optical disk 90 are first placed into the buffer memory 13 and then expanded to digital data by an audio compression/expansion encoder-decoder 14. The expanded digital data are supplied to a DIA converter 15.

The DIA converter 15 converts the expanded digital data from the audio compression/expansion encoder-decoder 14 to an analog audio signal. The analog audio signal is sent via an output terminal 16 to a reproduction output system (amplifiers, speakers, headphone, etc.), not shown, whereby the signal is output as a reproduced audio signal.

During the reproduction process, the system controller 11 works in diverse manners in response to how an operation unit 19 is operated. Specifically, the system controller 11 transfers various servo commands to the servo circuit 9; issues instructions to the memory controller 12 for control over the buffer memory 13; causes a display unit 20 to display an elapsed play time, a title of a currently reproduced program and other character information; and controls the EFM/CIRC encoder-decoder 8 for spindle servo and decoding processes.

In addition to the operation unit 19, a remote commander 29 is provided for the user to perform control manipulations. Illustratively, the remote commander 29 outputs a command in the form of an infrared modulated signal reflecting the user's operation. The command, i.e., operational information, is converted by an infrared receiver 23 into an electrical signal that is sent to the system controller 11. Given the operational information from the infrared receiver 23, the system controller 11 executes necessary control processing correspondingly.

Where an input audio signal is to be recorded to the disk 90 on the MD recorder 1, the audio signal is fed to an input terminal 17 or 21. For example, an analog audio signal from an analog output terminal of a CD player or like reproducing apparatus is applied to the input terminal 17. From the terminal 17, the signal is sent to an A/D converter 18 for conversion to a digital signal. The digital signal resulting from the conversion is sent to the audio compression/expansion encoder-decoder 14.

A digital audio signal sent in digital data format from a digital output terminal of a CD player or like reproducing apparatus is fed to the input terminal 21. From input digital audio signal, a digital communication format is decoded and control data are extracted by a digital interface 25. A digital audio signal output by the digital interface 25 is sent to the audio compression/expansion encoder-decoder 14.

The digital audio signal input to the audio compression/expansion encoder-decoder 14 is encoded thereby in compressed form using the ATRAC (acoustic transferred adapted coding) method. After being compressed, the digital audio signal is transferred at the rate of 0.3 megabits per second into the buffer memory 13 for temporary storage under control of the memory controller 12. On detecting at least a predetermined amount of compressed data accumulated in the buffer memory 13, the memory controller 12 permits retrieval of the data from the buffer memory 13.

When read from the buffer memory 13, the compressed data are supplemented with CIRC error correction coding by the EFM/CIRC encoder-decoder 8 and also subjected to EFM thereby. The data thus processed are sent to a magnetic head driving circuit 6. Upon receipt of the data thus processed, the magnetic head driving circuit 6 drives the magnetic head 6a for N/S polar magnetic field application.

When the magnetic head 6a is driven to write data through such magnetic field application, the system controller 11 brings the output power of the semiconductor laser (not shown) in the optical head 3 up to a level higher than that for reading data for reproduction. The enhanced laser emission heats the surface of the magneto-optical disk to the Currie temperature. The process fixedly writes to the recording surface of the disk the magnetic field information applied by the magnetic head 6a. That is, the data are recorded in the form of magnetic field information to the disk surface.

At the time of writing data, the system controller 11 also provides diverse controls. That is, the system controller 11 transfers various servo commands to the servo circuit 9; issues instructions to the memory controller 12 for control over the buffer memory 13; causes the display unit 20 to display an elapsed recording time, a title of a currently recorded program and other information; and controls the EFM/CIRC encoder-decoder 8 for spindle servo and encoding processes.

Where a digital data input is to be handled, extracted control data are admitted through the digital interface 25. In the case of an analog data input, an analog audio signal received through the input terminal 17 is supplied to a silence portion detector 22. The detector 22 monitors a silence portion illustratively between pieces of music supplied as the input audio signal. The information about the monitored status is sent to the system controller 11.

In addition to audio data, the MD recorder 1 may record to the disk 90 character information about each program constituted by the audio data (a piece of music or a track) and about the entire disk. The operation unit 19 has a character selecting member and a character input determining key operable for character information input by the user. The character selecting member may illustratively be a jog dial that enables characters to be selected, and the determining key when operated by the user determines the selected character string and terminates the character input process.

The remote commander 29 also permits character input. For that purpose, the remote commander is equipped with alphabetic keys (A to Z), symbol keys (period, comma, etc.), numeric keys, and a determining key. Using these keys, the user may input a character string and terminate the character input process by operating the determining key to finalize the character string in question.

The system controller 11 causes a RAM 24 to retain the characters input by the operation unit 19 or remote commander 29. When the input character string is definitely determined, the determined character string is saved corresponding to the program being selected at that point. The selected program refers to a program that is reproduced, recorded or put on hold at the time. If no program is being selected, the input character string is handled as character information corresponding to the entire disk.

The character information thus saved is written to and established in a U-TOC sector 1, to be described later, on the disk 90. Data in U-TOC sectors are updated at appropriate times after a recording operation or a character input operation.

This embodiment of the invention offers useful processes, to be described later, in dealing with the character input during dubbing. At that point, the system controller 11 transmits control signals to the apparatus (e.g., CD player) acting as the source of the audio signal to be dubbed. Control data necessary for the processing are stored in a ROM 27. Control signal transmissions to the CD player or the like are carried out via a terminal 26.

2. MD Track Format

Figure 2:
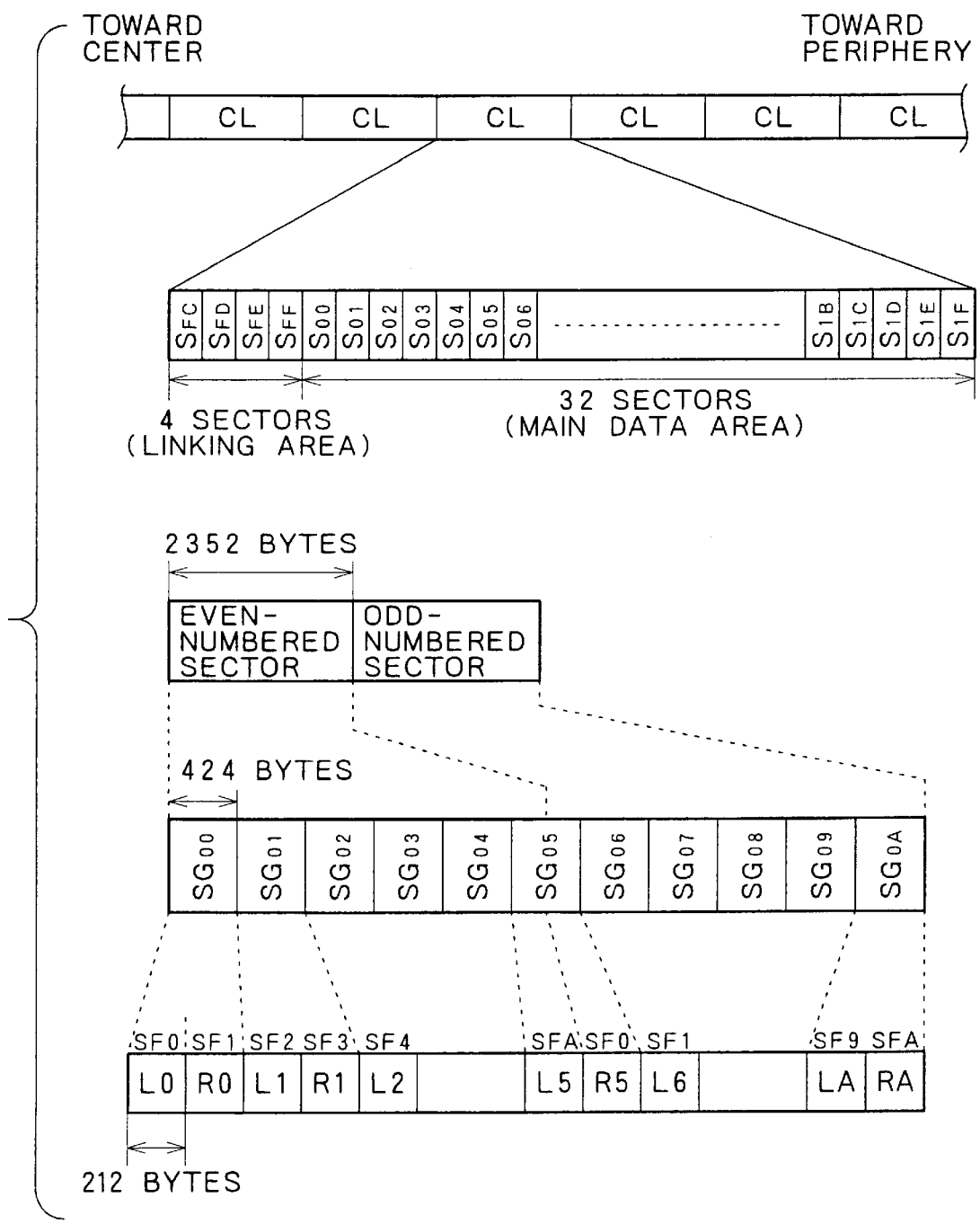
FIG. 2 is a schematic view of a data structure for recording on a magneto-optical disk applicable to this invention.

A cluster format of recorded data tracks on the magneto-optical disk 90 will now be described. On the mini-disk system, data are written to the disk surface in units of clusters. FIG. 2 shows a typical format of clusters. On the mini-disk, as shown in FIG. 3, clusters CL are formed continuously as recording tracks. A cluster is the minimum increment in which to record data. Each cluster corresponds to two or three tracks.

A cluster CL is made of a four-sector sub-data area (sectors $S_{FC}$ through $S_{FF}$) and a 32-sector main data area (sectors $S_{00}$ through $S_{1F}$). In audio applications, the main data refer to audio data compressed by the ATRAC method mentioned above. A sector is a data unit composed of 2,352 bytes.

The four-sector sub-data area may accommodate sub-data or may be used as a linking area. TOC data and audio data are written to the 32-sector main data area. The sectors in the linking area which basically remains a reserved area are superfluous sectors that ensure consistency between the sector length for error correction used primarily on the CD (13.3 msec.) and the CIRC interleave length which, adopted by this embodiment, is greater than the CD sector length. These sectors may be utilized for some processing or as a region in which to record some control data. An address is given to each sector.

Each sector is further divided into sound groups. Two sectors make up 11 sound groups. As illustrated, two contiguous sectors, one an even-numbered sector (e.g., sector $S_{00}$) and the other an odd-numbered sector (sector $S_{01}$), include 11 sound groups $SG_{00}$ through $SG_{0A}$. One sound group is composed of 424 bytes and constitutes an amount of audio data sufficient to fill a time period of 11.61 msec.

Within each sound group SG, data are recorded separately for the left and the right channels. For example, the sound group $SG_{00}$ is made of left channel data L0 and right channel data R0; the sound group $SG_{01}$ is constituted by left channel data L1 and right channel data R1. Each left or right channel data region made up of 212 bytes is called a sound frame.

3. U-TOC

Clusters, a typical format of which is shown in FIG. 2, are formed over the entire surface of the magneto-optical disk 90. When radially divided, an area on the innermost track side of the disk serves as a management area. Radially outside the management area is a program area.

The management area comprises a read-only area and part of a magneto-optical area. On the innermost track side is the read-only area where read-only data are recorded in pits. Radially outside the read-only area is a magneto-optical area portion to and from which data may be written and read in magneto-optical fashion.

Radially outside the management area including the magneto-optical area part is the program area. In the program area, audio data are recorded to sectors making up the main data area shown in FIG. 2.

As part of the management area, the read-only area includes a P-TOC (pre-mastered TOC) used for area management over the entire disk. Radially outside the PTOC is that magneto-optical area portion of the management area which has a U-TOC (user table of contents) recorded therein to manage the programs recorded in the program area.

To write or read data to or from the disk 90 requires retrieving management information, i.e., P-TOC and U-TOC beforehand from the disk. In accordance with the management information thus retrieved, the system controller 11 identifies the addresses of area locations to or from which to write or read data. The management information is held in the buffer memory 13. The buffer memory 13 is divided into two buffer areas: one for accommodating the data to be recorded or reproduced, the other for retaining the management information.

The system controller 11 reads the management information from the innermost track side of the disk 90 when it is loaded, and places the retrieved information into the buffer memory 13 for temporary storage. The management information held in the buffer memory 13 is subsequently referenced for write or read operations to or from the disk 90 in question.

The U-TOC is updated whenever data are written or deleted or every time character information is input or otherwise edited. Each time any of such data-modifying operations is carried out, the system controller 11 updates the U-TOC information in the buffer memory 13. In response to these updating operations, the U-TOC area on the disk 90 is updated accordingly using appropriate timings.

What follows is a description of U-TOC sectors making up the management information used to manage write and read operations to and from the tracks on the disk 90. FIG. 3 shows a format of a U-TOC sector 0. The U-TOC sectors may illustratively number from 0 up to 31. That is, the sectors ($S_{00}$–$S_{1F}$) of each cluster in the management area may be utilized. The sectors 1 and 4 may accommodate character information, and the sector 2 may have dates and times of recording sessions written therein.

The U-TOC sector 0 serves as a data area in which to store management information about user-recorded programs and about free areas to which new programs may be recorded. That is, the sector 0 includes a start and an end address of each of the programs recorded in the program area, as well as copy protect information and emphasis information used as mode information (track mode) on each program.

Illustratively, when a program is to be recorded to the disk 90, the system controller 11 references the U-TOC sector 0 to find a free area (i.e., recordable area) on the disk. The audio data constituting the program will be written to the area thus spotted. When a program is to be reproduced from the disk 90, the system controller 11 references the U-TOC sector 0 to detect the area in which the program in question is stored. The detected area will then be accessed for reproduction of the program.

As shown in FIG. 3, the U-TOC sector 0 comprises a header making up a sync pattern of 12 bytes, followed by three-byte data ("Cluster H," "Cluster L," "SECTOR") indicating the address of this sector, a maker code and a model code identifying the manufacturer of the disk, the first program number ("First TNO"), the last program number ("Last TNO"), sector use status ("Used Sectors"), a disk serial number, and a disk ID.

Following the header and its accompanying information are a pointer P-DFA (Pointer for defective area) pointing to the start position of a slot in which to place information about any defective area that may occur on the disk; a pointer P-EMPTY (Pointer for Empty slot) indicating the status of slot use; a pointer P-FRA (Pointer for Free area) pointing to the start position of a slot for managing free areas; and pointers P-TNO1, P-TNO2, ..., P-TNO255 constituting corresponding table designating data, each pointer pointing to the start position of the slot corresponding to a program number.

Subsequent to the corresponding table designating data is a management table comprising 255 slots of eight bytes each. Each of the slots comprises a start address, an end address, a track mode, and link information for management purposes.

The magneto-optical disk 90 of this embodiment does not require data to be consecutively written thereto. On the disk surface, a sequential data train may be written discretely, i.e., as a plurality of parts recorded in a distributed manner. Each of the parts in this case refers to a collection of chronologically continuous data written in physically continuous clusters.

As described, the reproducing apparatus applicable to the disk 90 (MD recorder 1 in FIG. 1) puts data into the buffer memory 13 for temporary storage. The rate of writing data to the buffer memory 13 is made different from the rate of reading data therefrom. In this setup, the optical head 3 is controlled sequentially to access and read discretely-written data from the disk 90; the read data are placed into the buffer memory 13. From the buffer memory 13, the data are reconstituted into a sequential data train for reproduction. During reproduction, the rate of writing data to the buffer memory 13 is higher than the rate of reading data therefrom. This ensures that audio signals are reproduced uninterruptedly.

It may happen that a short program is overwritten onto a longer, previously recorded program. In that case, any superfluous area need not be erased; the area need only be designated as a free area (an area managed by pointer P-FRA). This permits an efficient use of the available recording capacity.

Figure 4:
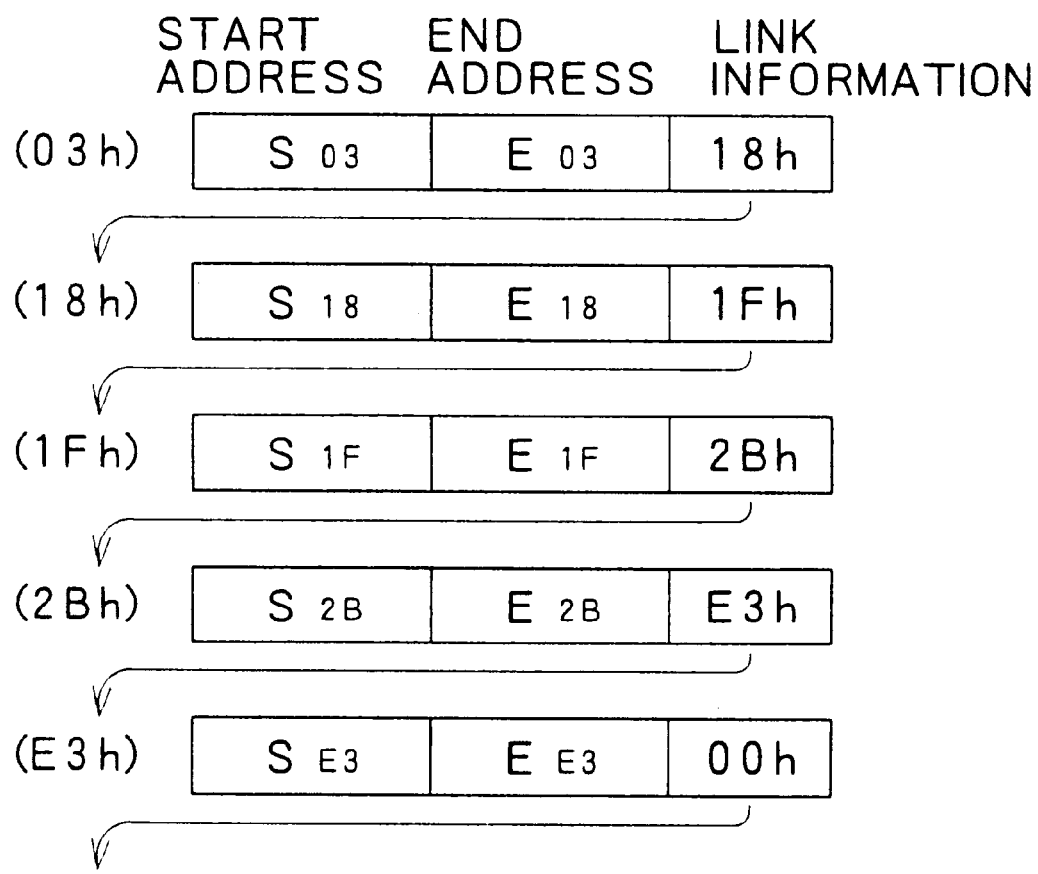
FIG. 4 is another schematic view of the management data structure for recording on a magneto-optical disk applicable to this invention.

Described below with reference to FIG. 4 is how discretely located areas are linked by use of the pointer P-FRA for free area management. Suppose that the pointer P-FRA pointing to the start position of the slot for managing a free area is set with a hexia-decimal value of 03h. In that case, the slot following the position 03h is accessed so that the data in the slot 03h of the management table are read. The start address and end address recorded in the slot 03h denote a start point and an end point of a part recorded on the disk. Link information written in the slot 03h points to the address of the next slot which in this case is illustratively 18h. The link information in the slot 18h leads illustratively to a slot 2Bh. The start address and end address held in the slot 2Bh designate a start point and an end point of another part on the disk. Likewise, the link information is traced until a data item 00h is reached. In this manner, the addresses of all points that may be managed by the pointer P-FRA are acquired.

As described, the slot pointed to by the pointer P-FRA is used as the origin from which to trace the slots involved until the link information becomes null (=00h). This makes it possible to link discretely recorded parts on the disk into a coherent train of parts in the memory. That is, all parts furnished as free areas on the disk 90 are grasped. Although this embodiment has taken the pointer P-FRA as an example, the same holds for the pointers P-DFA, P-EMPTY, P-TNO1, P-TN2, ..., P-TNO255 as well, each of which serves to link discretely recorded parts on the disk.

FIG. 5 illustrates a format of the U-TOC sector 1. The U-TOC sector 1 is used to manage character information about each of the programs recorded in the program area, as well as character information about the entire magneto-optical disk such as a disk title. Where the recorded programs are composed of audio data, the disk title may include an album title, names of players and other related information; the character information about each program may be a title of a piece of music. Such character information is input by the user's selecting, establishing and saving desired characters.

The character information about each program is recorded in the slot of a character table designated by the pointer P-TNA(x)(x=1 to 255) in the corresponding table designating data. One slot accommodates seven bytes of character information. Where the characters involved are numerous, a plurality of slots may be linked for the recording of characters by use of link information.

The U-TOC sector 2 is used to store, in the above-described format, dates and times at which the programs were individually recorded earlier in the program area. The U-TOC sector 4 serves to permit, in the format of FIG. 5, the use of katakana and kanji characters as fonts for character information such as the titles of programs recorded in the program area as well as the title of the entire magneto-optical disk.

4. Constitution of CD-MD Dubbing System

Figure 6:
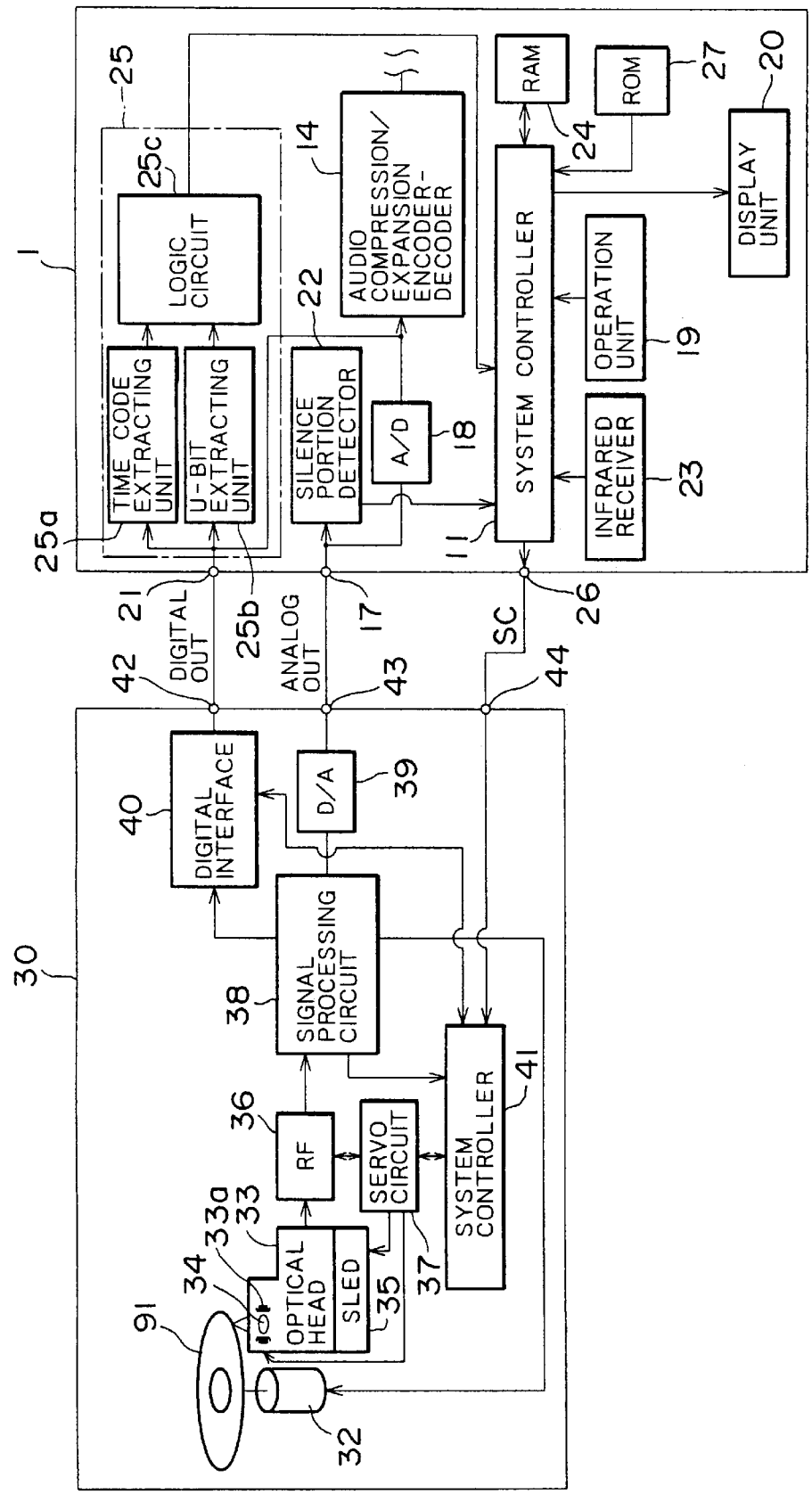
FIG. 6 is a block diagram of a magneto-optical disk recording apparatus and an optical disk reproducing apparatus applicable to this invention.

FIG. 6 is a block diagram of a CD-MD dubbing system embodying the invention. The MD recorder 1 in the block diagram actually corresponds to the entire setup of FIG. 1 but is shown only partially in FIG. 6. The parts already discussed in connection with FIG. 1 will not be described further.

The dubbing system is designed to record programs reproduced by the CD player 30 to the disk 90 on the MD recorder 1. The CD player 30 and MD recorder 1 may either be separate entities or make up integral equipment. When formed separately, the CD player 30 and MD recorder 1 may exchange signals over a cable. When formed integrally, the two devices may constitute a composite machine having two distinctive portions acting as a CD player and an MD player.

On the CD player 30 serving as the reproducing apparatus, an optical disk 91 (compact disk) is controlled in rotation by a spindle motor 32 at a constant linear velocity (CLV). An optical head 33 has an objective lens 33a, a biaxial mechanism 34, a semiconductor laser device (not shown), and a light receiver (not shown) receiving reflected light from the surface of the optical disk getting outgoing light from the semiconductor laser device.

The biaxial mechanism 34 has a focusing coil and a tracking coil. The focusing coil drives the objective lens 33a toward or away from the optical disk 91. The tracking coil drives the objective lens 33a in the radial direction of the optical disk 91. A sled mechanism 35 is also provided to drive the entire optical head 33 in large radial movements across the optical disk 91.

Reflected-light information detected by the light receiver in the optical head 33 is sent to an RF amplifier 36 for current-to-voltage conversion followed by matrix computations. In performing matrix computations, the RF amplifier 36 generates a focus error signal FE, a tracking error signal TE and an RF signal. The RF signal is a reproduced signal extracted as quantity-of-light information in effect when a laser beam is emitted onto the disk 91.

The focus error signal FE and tracking error signal TE generated by the RF amplifier 36 are subject to phase compensation and gain control by a servo circuit 37. Past the servo circuit 37, the two signals are supplied to the focusing coil and tracking coil of the biaxial mechanism 34 via a drive amplifier, not shown.

A low-pass filter (LPF) in the servo circuit 37 generates a sled error signal on the basis of the tracking error signal TE. The sled error signal is sent to the sled mechanism 35 via a sled drive amplifier, not shown.

The RF signal generated by the RF amplifier 36 reaches a signal processing circuit 38 whereby the signal is converted to binary format and subjected to EFM demodulation and CIRC error correction. From the processing by the signal processing circuit 38, a digital audio signal is extracted as representative of reproduced data.

The signal processing circuit 38 generates a spindle error signal that is fed to the spindle motor 32. The spindle error signal is used to control the disk in rotation based on the binary EFM signal.

In addition, the signal processing circuit 38 controls coarse positioning of PLL (phase locked loop) operations on the basis of the binary EFM signal. In so doing, the signal processing circuit 38 generates a reproduced clock signal. The servo circuit 37 and the signal processing circuit 38 are controlled by a system controller 41.

The digital audio signal from the signal processing circuit 38 is converted to an analog audio signal by a D/A converter 39. After the conversion, the analog audio signal is transmitted from an output terminal 43 to an input terminal 17 of the MD recorder 1.

Alternatively, the digital audio signal from the signal processing circuit 38 is sent to a digital interface 40 whereby the signal is supplemented with a control code and an error correcting code in preparation for transmission. The code-supplemented signal is transmitted from an output terminal 42 to an input terminal 21 of the MD recorder 1 as digital data. The data transmission takes place illustratively over an optical communication cable. The digital data are sent as an optical signal over the optical cable.

During a dubbing operation, the MD recorder 1 serving as the recording apparatus records the digital or analog audio signal to the disk 90. The signal is transmitted from the CD player 30. Suppose that the analog audio signal transmitted in analog format to the input terminal 17 is to be recorded to the disk 90. In that case, as discussed in connection with FIG. 1, the analog audio signal is converted to a digital audio signal by the A/D converter 18. The converted signal is input to the audio compression/expansion encoder-decoder 14 whereby the recording process described with reference to FIG. 1 is carried out.

In the above case, the analog audio signal input to the input terminal 17 is also supplied to the silence portion detector 22 that checks for a silent state lasting at least a predetermined period of time (e.g., 3 seconds) at the audio level. A signal indicating detection of such a silent state is sent to the system controller 11 as information representative of a program change (between pieces of music) in the supplied analog audio signal. On ordinary CDs, a silence portion of three to five seconds is provided between two adjacent pieces of music. Each silence portion, when detected, indicates a program number change.

If the digital data is fed to the input terminal 21, the digital interface 25 performs necessary processing. Specifically, a U-bit extracting unit 25b extracts U-bit data, i.e., a flag indicating a program change in the optically transmitted digital signal. A time code extracting unit 25a extracts time code data from the digital data in optically transmitted form, the time code data representing an elapsed reproduction time.

A logic circuit 25c is provided to perform logic operations on the outputs of both the U-bit extracting unit 25b and the time code extracting unit 25a. Given the outputs from the two extracting units, the logic circuit 25c generates a signal indicative of a program change in the digital audio signal sent from the reproducing apparatus side. The signal indicating the program change is sent to the system controller 11.

From the transmitted digital data, the time code extracting unit 25c extracts an elapsed reproduction time of each of the programs involved. The logic circuit 25c performs a logic operation on the elapsed reproduction time of −00:01 and on the U-bit change information, and generates the program change detection signal accordingly.

The program change detection signal may be generated alternatively by use of only the result of detection by the U-bit extracting unit 25b. As another alternative, silence portions may be detected in the same manner as with analog recording. In the latter case, a logic operation may be carried out on the result of such silence portion detection and on the U-bit change information.

The transmitted digital audio signal is forwarded from the digital interface 25 to the audio compression/ expansion encoder-decoder 14 whereby the recording process described with reference to FIG. 1 is conducted. Where the user inputs characters during the dubbing operation, the character codes thus input are stored in the RAM 24 in conjunction with the current program number. The ROM 27 stores beforehand commands for controlling the CD player 30 acting as the reproducing apparatus.

5. Control on CD-MD Dubbing Session

When getting the above-described dubbing system to dub reproduced audio signals from the disk 91 to the disk 90, the user may input characters denoting titles or other information about each program. This provides efficient dubbing work. Described below with reference to FIG. 7 is how the system controller 11 operates when characters are input during the dubbing session.

Basically, the character data input during dubbing are regarded as character information pertaining to the currently dubbed program. With conventional apparatuses, the input of character information must be terminated before the dubbing of the current program comes to an end. By contrast, this invention proposes a dubbing method whereby character input is allowed not to be complete (e.g., because of numerous characters involved) before the end of the currently dubbed program, with no problems or complications experienced.

Figure 7:
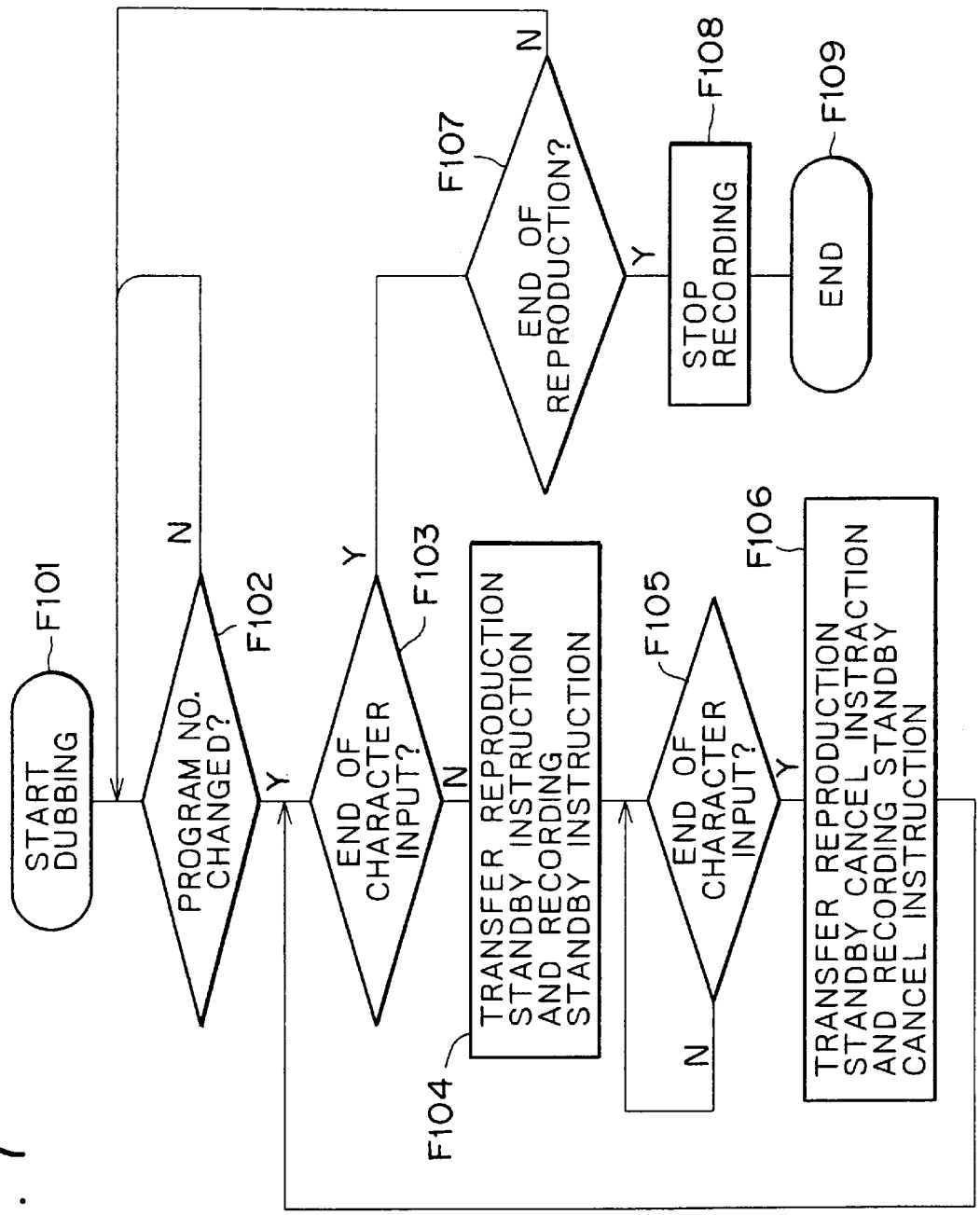
FIG. 7 is a flowchart of steps for dubbing according to this invention.

In step F101 of FIG. 7, dubbing of data from a CD (disk 91) to an MD (disk 90) is designated. This starts supplying an audio signal from the CD player 30 to the analog input terminal 17 or digital input terminal 21 of the MD recorder 1.

In step F102, the system controller 11 checks to see if a program number change has occurred during dubbing. The check is based on the signal from the silence portion detector 22 or from the digital interface 25.

If a program number change is detected in step F102, step F103 is reached. In step F103, a check is made to see if character input by way of character input means (i.e., remote commander 29 or operation unit 19) has ended. If no character is found to be input for the current program whose dubbing has just ended (i.e, the user has not input any characters), the result of the check in step F103 is considered affirmative and step F107 is reached.

Whether or not character input has ended in step F103 is determined by checking the operation of the determining key. That is, a check is made to see if the determining key mounted on the remote commander 29 or operation unit 19 has been operated. The check makes it possible to ascertain, immediately before a program number change, whether the input of characters such as a title of the dubbed program has come to an end.

If it is found in step F103 that the character input by use of the character input means has ended, step F107 is reached. In step F107, a check is made to see if the currently dubbed program is the last program. If the current program is indeed found to be the last program, step F108 is reached. In step F108, the system controller 11 issues a command to halt the recording operation, stopping the servo circuits and bringing the recording session to an end (step F109).

If it is found in step F107 that the currently dubbed program is not the last program, then step F102 is reached again. In step F102, the system controller 11 keeps checking for a program number change occurring during dubbing.

If it is found in step F103 that the character input using the character input means has not ended, the system controller 11 goes to step F104. In step F104, the system controller 11 issues a command to put the audio output of the disk 91 into a standby state. The command is sent to the system controller 41. In response, the system controller 41 places the CD player 30 into a standby state. The system controller 11 also issues necessary commands to put the recording operation of the MD recorder 1 into a standby state. These commands are forwarded to the servo circuit 9, memory controller 12 and other relevant components.

As described, if the program number has changed on the reproducing side, the standby state is reached. The standby state remains on at the beginning of the next program, and the recording operation on the recording side is also placed in the standby state. In the meantime, the user may continue inputting the remaining characters.

If the audio output of the CD player 30 and the recording operation of the MD recorder 1 are both placed in the standby state in step F104, step F105 is reached. In step F105, a check is made to see if the character input by the user has ended. The check may typically involve verifying whether or not the user has operated the determining key.

If the character input is found to have ended in step F105, step F106 is reached. In step F106, the system controller 11 issues necessary commands to cancel the standby state of both the recording operation of the MD recorder 1 and the audio output of the CD player 30. The commands are sent to the system controller 41.

The steps above resume the dubbing session from the next program. In the processing of FIG. 7, control is returned to step F102 through steps F103 and F107. If it is found in step F107 that the next program is not to be reproduced (i.e., end of dubbing), then the dubbing session is terminated in steps F108 and F109.

With the inventive dubbing method, as described, the user need not be in a hurry to input characters illustratively about the currently dubbed program. If the dubbing of the current program is terminated before the end of the character input regarding that program, the dubbing operation of the next program is automatically put on hold. This means that there are no longer constraints stemming from the conventional need to input characters in time for a short piece of music, or to enter an appreciably long character string about a program during its recording. The user, even if not very familiar with character input procedures, may take his or her time inputting necessary characters during the recording operation.

Although the description above contains many specificities, these should not be construed as limiting the scope of the invention but as merely providing illustrations of the presently preferred embodiments of this invention. It is to be understood that changes and variations may be made without departing from the spirit and scope of the claims that follow. For example, The commands sent from the recording side to the reproducing side to designate a standby state, as well as the commands to cancel the standby state of the reproducing side, may be controlled from a remote location by use of infrared rays or the like. Although the example of FIG. 2 involves data transmissions in a digital communication interface format, such transmissions are unnecessary if the recording side and reproducing side are integrally built into a composite machine. In some cases, the two system controllers 11 and 41 may be constituted by a single microcomputer.

As described, it may happen that during the dubbing of programs, the input of character information such as a title of the currently dubbed program may not end in time for the current program to be replaced by the next program. In such a case, according to the invention, the dubbing session is placed at least into a standby state as long as the character input does not end. The user is allowed to continue inputting the necessary characters in the standby state. This ensures that each user-entered program title is recorded exactly corresponding to each currently dubbed program. The user is free from any additional restrictions of operation because the actions to put the dubbing operation into a standby state and to cancel such a standby state are carried out automatically.

What is claimed is:

1. A recording apparatus for recording supplied data as programs to a recording medium having a program area for recording programs and a management area for recording management information about the programs recorded in said program area, said recording apparatus comprising:

character inputting means for inputting character information about programs to be recorded;

detecting means for detecting a change from one supplied program to another to be recorded;

judging means for judging whether the input of character information by said character inputting means has ended upon detection of a change to the next program by said detecting means; and controlling means used when said judging means does not judge the character information input to have ended, said controlling means thereupon placing the recording operation into a standby state and issuing an instruction to put the supply of said next program into a standby state.

2. A recording apparatus according to claim 1, wherein said character inputting means includes a character input determining key, and wherein said controlling means cancels the standby state of said recording operation as well as the standby state of the supply of said next program in accordance with the operation of said character input determining key.

3. A recording system made of a reproducing part and a recording part, said recording part recording programs supplied from said reproducing part to a recording medium having a program area for recording programs and a management area for recording management information about the programs recorded in said program area, said recording system comprising:

- character inputting means for inputting character information about programs to be recorded;
- detecting means for detecting a change of a program supplied from said reproducing part;
- judging means for judging whether the input of character information by said character inputting means has ended upon detection of the program change by said detecting means; and
- controlling means used when said judging means does not judge the character information input to have ended, said controlling means thereupon placing the recording operation into a standby state and issuing an instruction to put the supply of the next program from said reproducing part into a standby state.

4. A dubbing method comprising the steps of:

- detecting a change of a program transmitted from a reproducing device;
- when said detecting step detects a change of the programs transmitted from said reproducing device, judging, as a first judging step, whether a character input corresponding to said program has ended;
- when said first judging step does not judge the character input corresponding to said program to have ended, providing controls to place into a standby state the transmission of the next program from said reproducing device and to put the recording operation into a standby state;
- judging, as a second judging step, whether the character input has ended when both the transmission of said next program from said reproducing device and said recording operation are placed into the standby state; and
- when said second judging step judges the character input to have ended, canceling the standby state of both the transmission of said next program from said reproducing device and said recording operation.

* * * * *